United States Patent [19]

Possati

[11] 4,341,019
[45] Jul. 27, 1982

[54] GAUGE FOR CHECKING LINEAR DIMENSIONS
[75] Inventor: Mario Possati, Bologna, Italy
[73] Assignee: Finike Italiana Marposs S.p.A., S. Marino di Bentivoglio, Italy
[21] Appl. No.: 171,159
[22] Filed: Jul. 22, 1980
[30] Foreign Application Priority Data
Jul. 24, 1979 [IT] Italy ................ 3463 A/79
[51] Int. Cl.³ ............................... G01B 7/00
[52] U.S. Cl. ............................ 33/172 E; 33/148 E; 73/105; 177/229
[58] Field of Search ............ 33/172 E, 174 P, 174 L, 33/148 E, 169 R; 73/775, 776, 105; 177/229, 211, 136, 138; 338/5, 6

[56] References Cited
U.S. PATENT DOCUMENTS

| 2,396,394 | 3/1946 | Shaw | 73/105 |
| 2,487,681 | 11/1949 | Weisselberg | 338/6 |
| 2,598,812 | 6/1952 | Marco et al. | 338/5 X |
| 3,075,160 | 1/1963 | Starr | 338/5 |
| 3,166,852 | 1/1965 | Whitney | 33/172 E X |
| 3,602,866 | 8/1971 | Saxl | 177/211 |
| 3,987,551 | 10/1976 | Kienle | 33/172 E |

FOREIGN PATENT DOCUMENTS

| 581311 | 8/1959 | Canada | 338/5 |
| 2905644 | 8/1979 | Fed. Rep. of Germany | 177/229 |

Primary Examiner—William D. Martin, Jr.
Attorney, Agent, or Firm—Stevens, Davis, Miller & Mosher

[57] ABSTRACT

A gauge for checking linear dimensions of pieces, including a support, an arm, movable with respect to the support, which carries a feeler for contacting the piece to be checked, and a position transducer for providing a signal responsive to the position of the arm.

The arm is coupled to the support through an element including a bent portion having a flat chamfer on the convex side. The chamfer defines, in the bent portion, a thin section, resiliently flexible, which acts as a fulcrum for permitting rotational movements of the arm.

18 Claims, 9 Drawing Figures

GAUGE FOR CHECKING LINEAR DIMENSIONS

The present invention relates to a gauge for checking linear dimensions, including a support; fulcrum means carried by the support; an arm, associated with the fulcrum means, movable with respect to the support; a probe associated with the movable arm in order to transmit to the latter measurement displacements; and transducer means for providing a signal depending on the position of the movable arm; the fulcrum means including an element with a lightened section that is resiliently flexible for defining a geometrical axis of rotation, the element including a first and a second portion and a joining portion between the first and the second portion.

More particularly the present invention relates to gauges, or measuring heads, for checking linear dimensions of mechanical pieces.

Gauges for checking linear dimensions, including one or more fulcrums of rotation, are already known, for example, from Italian Patent No. 940.271. The fulcrum is achieved by making a hole and a split in an arm supporting element. The hole and the split cause the cross-section thickness of the supporting element to rapidly restrict, so as to define a portion with minimum thickness adapted to render this portion resiliently flexible. Thus the supporting element is made up of two portions connected by the portion having smaller thickness, which allows the relative rotational movement of the first two portions and consequently the movement of the measuring arm, fixed to one of the first two portions, with respect to a support, to which the second of the two portions is fixed.

This type of fulcrum provides the required amount of flexibility so as to achieve the required motion for rotation, but at the same time it is quite resistant to any strains that may tend to cause movements of a different type. Moreover the absence of any sliding and friction movements ensures enduring repeatability and accuracy of measurement takings.

However, these known fulcrums present some drawbacks insofar as realization costs and techniques are concerned. As the dimensional inspection of a mechanical piece may necessarily require a considerably large number of measuring heads or units, it is evident that the previously mentioned drawbacks could become quite relevant.

An object of the invention is to provide a gauge including a fulcrum, that has the advantages of the previously described known fulcrums, yet which may be manufactured in a simpler and less expensive way than those of the prior art.

These and other objects and advantages are obtained through a gauge of the type described at the beginning of this description wherein, according to the invention, the joining section is bent and has at its convex side a chamfer adapted to locally reduce the thickness of the joining section, in order to define the lightened section.

The invention is now described in detail with reference to the accompanying drawings, given by way of non-limiting example, in which.

Figure 1:
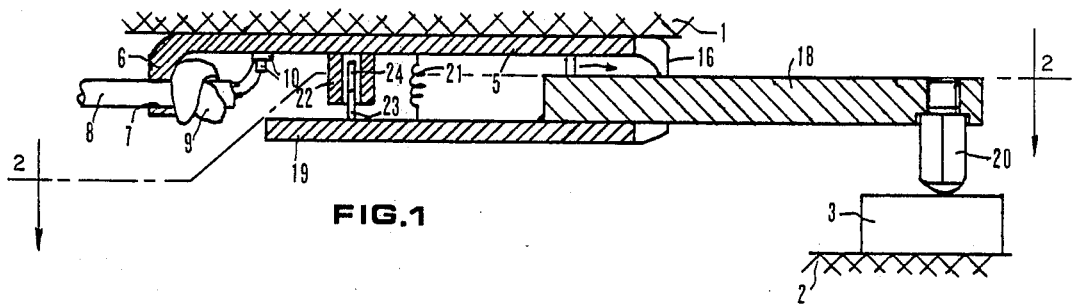
FIG. 1 is a vertical longitudinal section view of a gauge for checking linear dimensions of mechanical parts, according to a first embodiment of the invention.
Figure 2:
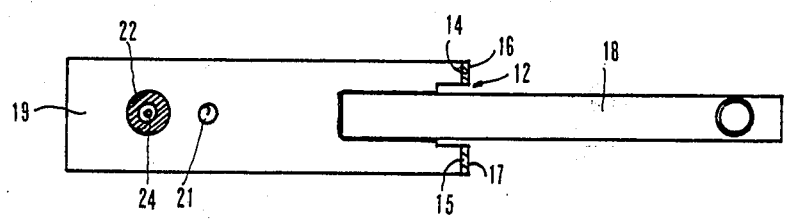
FIG. 2 is a longitudinal section view along line 2—2 of the gauge shown in FIG. 1.

The measuring head shown in FIGS. 1 and 2 has a support 1 fixed to a base 2 whereupon lies a piece 3 the height of which has to be checked or, to be more exact, the height deviation from a nominal value.

Locked to support 1 (FIG. 1) is a flat longitudinal element 5 ending at one end with a wing 6, that extends in a transversal direction with respect to support 1. Wing 6 has a bore 7 for the passage of an electric cable 8. Cable 8 has a tear-resisting knot 9 that rests on the surface of wing 6.

The wire leads of cable 8 end at terminals 10 connected to element 5. Element 5 consists of a single piece of bent sheet steel for spring and is bent to a U-shape at its side opposite to wing 6. Element 5 has a transversal portion 11 with a hole 12. Portion 11 includes two sections 14 and 15 of smaller thickness, acting as fulcrums. The lightening of the two sections 14 and 15 is achieved through a grinding operation made by a grinding machine that makes chamfers 16 and 17 in the convex part of portion 11. The surface of chamfers 16 and 17, under rest conditions, are substantially perpendicular to the two sides of element 5.

An arm 18 having square cross-section passes through hole 12 and it is welded to a side 19 of element 5. The resilient deflection of sections 14 and 15 allows side 19, together with arm 18, to rotate about a geometric axis crossing sections 14 and 15. A probe, or feeler, 20 is clamped at the end of arm 18. A spring 21 applies to side 19 a force that tends to make arm 18 rotate in a clockwise direction, thus bringing feeler 20 in touch with piece 3 with an adequate contacting force.

A differential position transducer, including windings 22 connected to the upper part of element 5, a spindle 23 clamped to side 19 and a magnetic core 24, provides, by means of power supply and output cable 8, a signal responsive to the position of feeler 20.

Figure 3:
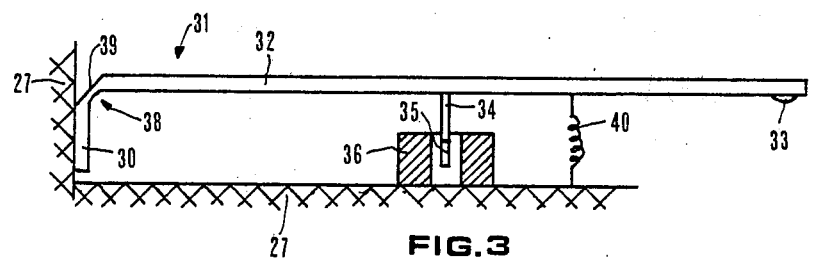
FIG. 3 is a vertical longitudinal section view of a gauge according to the preferred embodiment of the invention.

The measuring head shown in FIG. 3 is carried by a support 27 at a side of which there is clamped the shorter side 30 of an L-shaped bent-sheet steel element 31. The longer side, or arm 32, of element 31 carries a feeler 33 at its end and a spindle 34 with a magnetic core 35 located at an intermediate point. The magnetic core 35 moves within windings 36 fixed to support 27.

A cable 37 connects windings 36 to a power supply and detection unit, not shown.

The two sides 30 and 32 of element 31 are connected by a bent portion 38 that has on its convex side a flat chamfer 39. The surface of chamfer 39 forms, at rest conditions, a 45 degree angle with the longitudinal geometrical axes of sides 30 and 32. The thickness of the sheet steel of element 31 may be, for example, of 2 mm and at the chamfer 39 portion it is reduced to a minimum value of 0,7 mm. Side 32 may thus accomplish limited rotating movements about the horizontal geometrical axis (perpendicular to plane of FIG. 3) crossing the most lightened zone of portion 38.

A spring 40, connected between side 32 and support 27, tends to make arm 32 rotate in a clockwise direction thus causing feeler 33 to contact the surface of the piece to be checked (not shown) with an adequate contact force.

Figures 5, 6:
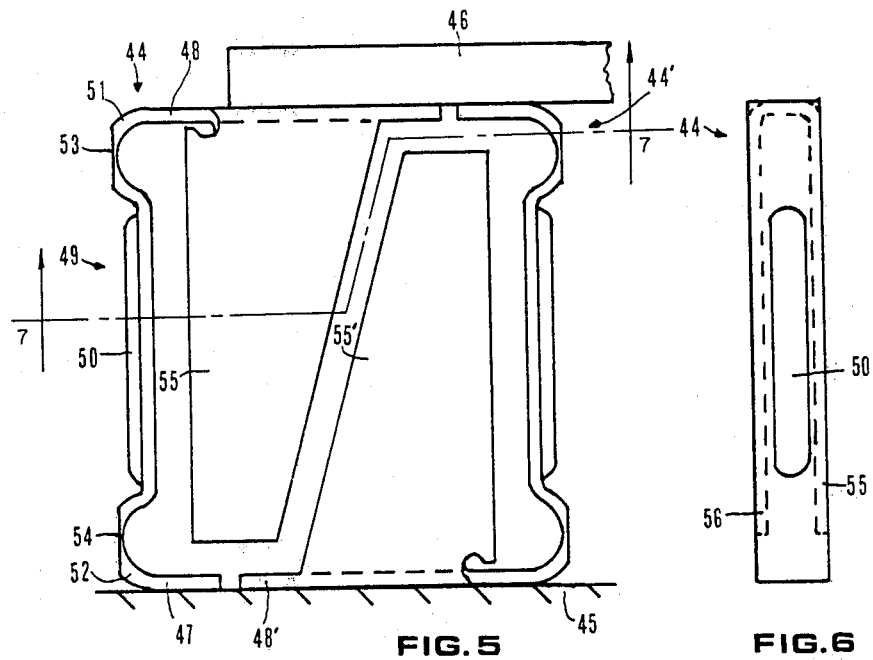
FIG. 5 is a lateral view of an arm-set for measuring heads of the so-called "parallelogram" type, illustrating a third embodiment of the invention.
FIG. 6 is a lateral partial view of the arm-set shown in FIG. 5.
Figure 7:
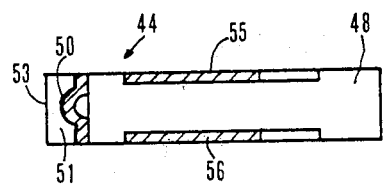
FIG. 7 is a section view along line 7—7 of an element of the arm-set shown in FIG. 5.

The arm-set shown in FIGS. 5, 6 and 7 includes two identical elements 44 and 44' made of bent sheet steel. These two elements are joined i.e. welded, at their lower bases, to a support 45 fixed to a casing (not shown) of a measuring head. At the upper bases of elements 44 and 44' there is joined, i.e. welded, a movable arm 46 bearing a feeler, not shown.

Element 44 is now described in more detail. It consists of a single piece of shaped sheet steel with two horizontal edges 47 and 48 and a substantially vertical portion 49. Portion 49 has a central part 50 and two curved portions 51 and 52 that joint part 50 to the horizontal edges 47 and 48 respectively. On the outer convex surface of portions 51 and 52 there are two ground flat chamfers 53 and 54 that reduce the sheet steel thickness so as to form two thin resiliently flexible sections.

The surfaces of chamfers 53, 54 under rest conditions are perpendicular to the horizontal edges 47 and 48.

Element 44 also includes two vertical plates 55 and 56 fixed to the upper horizontal edge 48.

Element 44', as already mentioned, is identical to element 44, but it is connected to the latter in a reversed position, i.e. with its horizontal edge 48' aligned with edge 47 and with plate 55' aligned with plate 55.

To the pairs of plates of the two elements 44 and 44' there are clamped relevant elements of a transducer, not shown, and the ends of a spring, also not shown, that provides the appropriate value of contact force between a feeler and the piece to be checked.

It is obvious that while in the gauges of FIGS. 1 to 4 the feelers basically accomplish a rotating movement, the arm-set shown in FIGS. 5 to 7 enables the feeler to accomplish a substantially straight-line movement, typical of the parallelogram type arm-sets. Obviously, however, each of the four fulcrums defined by the lightened sheet steels allows a rotatory motion about horizontal axes that are perpendicular to the plane of FIG. 5.

Figure 8:
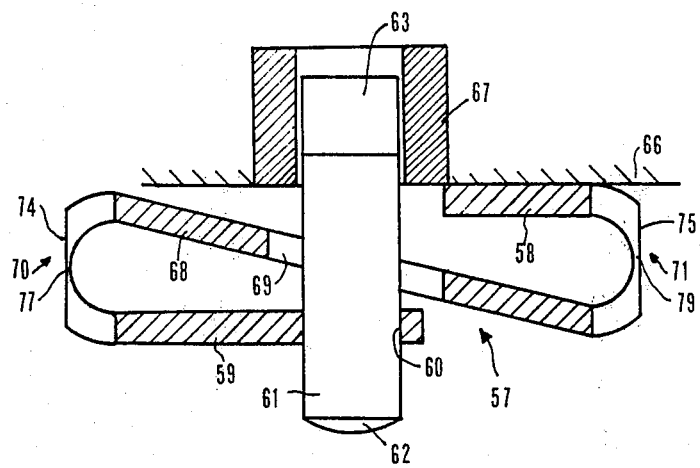
FIG. 8 illustrates a sectioned elevational view along line 8—8 of FIG. 9
Figure 9:
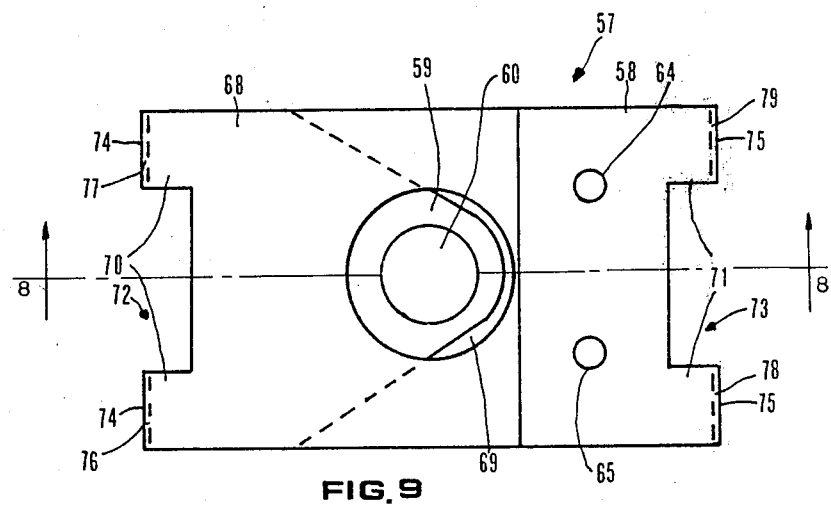
FIG. 9 illustrates a plan view respectively of an arm-set according to a fourth embodiment of the invention.

The arm-set shown in FIGS. 8 and 9 also enables a feeler element, or contact, to perform a substantially straight-line movement. The arm-set shown in FIG. 8 is fixed to a support of a measuring head and it is equiped with a transducer, whereas in FIG. 9 there is shown a plan view of just the arm-set. The arm-set illustrated in FIGS. 8 and 9 consists of an element 57 made of shaped plate having two bases 58 and 59 that are parallel to each other under rest conditions. Base 59 has a hole 60 for housing and clamping a spindle 61 bearing a feeler 62 and a magnetic core 63. Base 58 is clamped by means of screws, not shown, passing through holes 64 and 65, to a support 66 housing windings 67 of a position transducer with differential transformer that also comprises core 63.

Element 57 also includes a diagonal section 68 with a hole 69 for the passage of spindle 61. The ends of the diagonal section 68 are connected to bases 58 and 59 by means of two pairs of connections that define rotation fulcrums. The two pairs of connections consist of two parts 70 and 71 of element 57 that are bent to a U-shape and have the ends of the U brought close together. The two parts 70 and 71 are lightened by openings 72 and 73 and by flat chamfers 74 and 75 obtained on the convex sides of parts 70 and 71 by a grinding operation. The surfaces of chamfers 74 and 75 under rest conditions are perpendicular to bases 58 and 59. Parts 70 and 71 that have a cylindrical surface on the interior concave side, define four thin sections 76, 77, 78 and 79 that determine two pairs of rotational fulcrums. Fulcrums 76 and 77 are aligned along a first geometrical axis of rotation and fulcrums 78 and 79 along a second geometrical axis of rotation. These two geometrical axes of rotation lie in a plane that is parallel to the two bases 58 and 59 and are equally distant from them.

The geometrical axis of spindle 61 and feeler 62 lies in a central position with respect to sections 76, 77, 78 and 79. The four fulcrums defined by sections 76, 77, 78 and 79 are achieved in such a way as to provide the same amount of flexibility, while they oppose a considerable amount of resistance to any stresses other than deflections, and in particular to torsions.

Whenever a force is applied to feeler 62, according to the direction of the geometrical axis of spindle 61, the movement of the feeler that results from the rotations about fulcrums 76, 77, 78 and 79 is directed along the same geometrical axis of spindle 61.

The arm-set shown in FIGS. 8 and 9 thus enables an axial movement of the feeler to occur by exploiting a simple constructional form that foresees two pairs of frictionless and non-sliding fulcrums obtained from a single piece of plate bent to a substantially S-shape.

Figure 4:
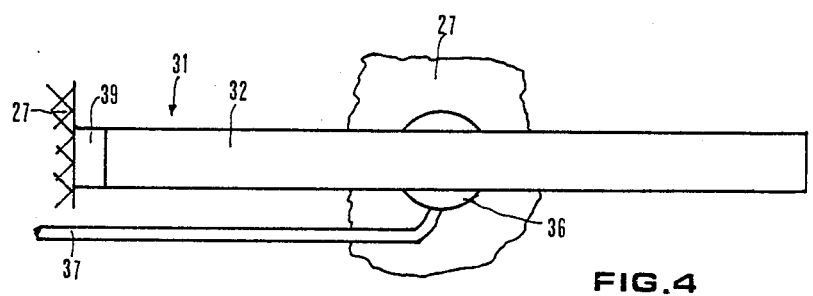
FIG. 4 is a plan view of the gauge shown in FIG. 3.

In order to increase the resistance to bending stress of side 19 of element 5 shown in FIGS. 1 and 2 and side 32 of element 31 shown in FIGS. 3 and 4, these sides 19 and 32 may have stiffening ribs that are obtained by bending two lateral edges of the relevant sheet steel elements 5 and 31.

The invention has been described referring to embodiments that relate to electronic gauges, but it may also apply to mechanical or pneumatic devices, or even others of another type.

What is claimed is:

1. A gauge for checking linear dimensions, including: a support; fulcrum means carried by the support; an arm associated with the fulcrum means and movable with respect to the support; a probe associated with the movable arm in order to transmit to the arm measurement displacements; and transducer means for providing a signal depending on the position of the movable arm; the fulcrum means including an element with a lightened section that is resiliently flexible for defining a geometrical axis of rotation, the element including a first and a second portion and a joining portion between the first and the second portion, wherein the joining portion is bent and has at its convex side a chamfer adapted to locally reduce the thickness of the joining portion, in order to define the lightened section.

2. The gauge according to claim 1, wherein said chamfer is a plane.

3. The gauge according to claim 1 or claim 2, wherein said element has a basically L-shape.

4. The gauge according to claim 3, wherein said L-shaped element consists substantially of a single piece of bent sheet steel and one portion is said arm which consists substantially of a side of the L-shaped element.

5. The gauge according to claim 1 or claim 2, wherein said element has a substantially U-shape.

6. The gauge according to claim 5, wherein said U-shaped element consists of a single piece of sheet steel.

7. The gauge according to claim 6, wherein said joining portion corresponds to the base of said U and has a central hole for the passage of said arm, the hole dividing said lightened section into two parts.

8. The gauge according to claim 6, wherein the surface of said chamfer is substantially perpendicular to the two legs of said U.

9. The gauge according to claim 3, wherein said chamfer has a slanted surface with respect to the sides of said L.

10. The gauge according to claim 9, wherein the surface of said chamfer forms, at rest conditions, a 45 degree angle with respect to the sides of said L.

11. The gauge according to claim 1 or claim 2, wherein said fulcrum means includes a parallelogram type arm-set, the arm-set including two elements placed side by side, each element having two parallel edges and a part joining the two edges, the joining part defining, near the associated edges, two bent sections, with chamfers at the convex sides.

12. The gauge according to claim 11, wherein each of said elements placed side by side consists of a single piece of bent plate.

13. The gauge according to claim 1, or claim 2, wherein said element has two bent sections that have flat chamfers at related convex sides to define two lightened sections, the element being adapted to permit substantially straight-line displacements of the probe.

14. The gauge according to claim 13, wherein said element has two bases that are parallel at rest conditions, one of the bases being fixed to the support and the other base supporting said probe, said lightened sections defining two geometrical axes of rotation lying in a plane that is parallel to the two bases.

15. The gauge according to claim 13, wherein each of said bent sections defines two rotation fulcrums.

16. The gauge according to claim 13, wherein said transducer means include circuits fixed to said support.

17. The gauge according to claim 13, wherein said element has a substantially S-shape.

18. The gauge according to claim 17, wherein said S-shaped element consists of a single piece of bent plate.

* * * * *